United States Patent [19]

Mori

[11] Patent Number: 4,699,450

[45] Date of Patent: * Oct. 13, 1987

[54] DEVICE FOR DIVERTING A PORTION OF LIGHT ENERGY TRANSMITTED THROUGH AN OPTICAL CONDUCTOR

[76] Inventor: Kei Mori, 3-16-3-501, Kaminoge, Setagaya-ku, Tokyo, Japan

[*] Notice: The portion of the term of this patent subsequent to Jul. 28, 2004 has been disclaimed.

[21] Appl. No.: 698,298

[22] Filed: Feb. 5, 1985

[30] Foreign Application Priority Data

Jun. 28, 1984 [JP] Japan ................ 59-133892
Jul. 30, 1984 [JP] Japan ................ 59-159520

[51] Int. Cl.⁴ ............................................. G02B 26/08
[52] U.S. Cl. ............................ 350/96.15; 350/172; 350/267; 350/486; 362/32
[58] Field of Search ........... 350/96.15, 96.16, 96.18, 350/170, 171, 172, 173, 267, 484, 486; 362/32

[56] References Cited

U.S. PATENT DOCUMENTS

| | | | |
|---|---|---|---|
| 4,173,390 | 11/1979 | Käch | 350/96.16 |
| 4,384,761 | 5/1983 | Brady et al. | 350/267 |
| 4,400,054 | 8/1983 | Biard et al. | 350/96.15 |
| 4,576,436 | 3/1986 | Daniel | 350/173 X |
| 4,610,501 | 9/1986 | Mori | 350/96.15 X |
| 4,636,028 | 1/1987 | Mori | 350/96.15 |

FOREIGN PATENT DOCUMENTS

| | | | |
|---|---|---|---|
| 0026379 | 4/1981 | European Pat. Off. | 350/96.15 |
| 2823458 | 12/1978 | Fed. Rep. of Germany | 350/484 |
| 0103318 | 6/1985 | Japan | 350/96.16 |

*Primary Examiner*—John Lee
*Attorney, Agent, or Firm*—Jordan and Hamburg

[57] ABSTRACT

A light diverting device for diverting a part of the light energy transmitted through an optical conductor rod and for taking it out comprises a first optical conductor rod having a through-hole in a radial direction; second and third optical conductor rods tightly inserted into the through-hole, the second and third optical conductor rods having inclined edge surfaces which engage each other in the through-hole to form a space therebetween; and a fourth optical conductor rod mounted on an outer circumferential surface of the first optical conductor rod for covering an exposed end of the second optical conductor rod in the throughhole. Optical oil is enclosed in the space between the inclined edge surfaces of the second optical conductor rod and the third optical conductor rod. A cover member mounted on the outer circumference of the first optical conductor rod covers an exposed end of the third optical conductor rod in the through-hole. The third optical conductor rod is movable back and forth in the through-hole to vary the size of the space defined by the inclined edge surfaces of the second and third optical conductor rods, thus varying the level of optical oil in the space and the amount of light diverted from the first optical conductor rod to the fourth optical conductor rod.

9 Claims, 6 Drawing Figures

DEVICE FOR DIVERTING A PORTION OF LIGHT ENERGY TRANSMITTED THROUGH AN OPTICAL CONDUCTOR

BACKGROUND OF THE INVENTION

The present invention relates to a light diverting device for diverting a part of the light energy transmitted through an optical conductor rod and for taking it out.

The present applicant has proposed various ways to focus solar rays or artificial rays by means of a lens or the like and guide them into an optical conductor, and further to transmit the rays through the optical conductor onto an optional desired place for use in illumination or for other purposes.

However, in such systems if the light energy propagating through the optical conductor can be diverted at the half way point and taken out from it, it is possible to greatly improve its effective use.

The present applicant has proposed, in view of the circumstances described above, a light diverting device capable of diverting a part of the light energy propagating through it and for also taking it out.

The light diverting device which the present applicant has proposed is comprised of a first optical conductor rod having a through-hole formed in a radial direction, a second optical conductor rod and a third optical conductor rod which are tightly inserted into the through-hole. The second optical conductor rod is firmly fixed by use of optical paste or the like. The edge surface portion of the second optical conductor rod in the through-hole is formed on a surface which is inclined in relation to the direction of the first optical conductor rod's axis. The third optical conductor rod has an inclined surface opposed to the inclined surface of the second optical conductor rod and is tightly inserted into the through-hole so as to be able to move back and forth in the through-hole. A groove is formed on the uppermost portion of the third optical conductor rod along the direction of its axis. Optical oil is poured into the gap between the inclined surface of the second optical conductor rod and the inclined surface of the third optical conductor rod through the groove. When the third optical conductor rod moves back and forth in the through-hole in relation to the second optical conductor rod, air in the gap between them is let out of it or air is sucked into it so as to facilitate the movement of the third optical conductor rod.

In such a manner, after pouring optical oil into the gap, when the third optical conductor rod is pushed forward the distance of the gap decreases and the level of optical oil rises. On the contrary, when the third optical conductor rod is pulled backward the distance of the gap increases and the level of optical oil falls.

The light rays propagating through the first optical conductor rod are reflected on the inclined surface of the second optical conductor rod in the area of the gap where there is no optical oil, while the light rays are passed through in the area of the gap where there is optical oil. Accordingly, the amount of light rays reflected by the inclined surface of the second optical conductor rod can be adjusted in accordance with the level of optical oil in the gap. Such adjustment can be performed by changing the insertion depth of the third optical conductor rod.

A fourth optical conductor rod is firmly fixed on the outer circumferential surface of the first optical conductor rod so as to cover tightly the inserted portion of the second optical conductor rod which is unitarily formed with the second optical conductor rod. In such a construction as mentioned heretofore, the light rays reflected by the inclined surface of the second optical conductor rod are taken out through the fourth optical conductor rod and transmitted through an optical conductor cable, which is connected with the fourth optical conductor rod, onto an optional desired place for use in illumination or for other purposes.

However, in the afore-mentioned light diverting device, optical oil in the space between the inclined surfaces comes in contact with the outside air through the groove formed in the third optical conductor rod. Consequently, there exists defects when the optical oil leaks through the groove or where dust or dirt enter into the optical oil, making difficult prolonged use of the oil. Furthermore, since the groove portion forms an air layer, light dispersion and a loss of light energy occur.

SUMMARY OF THE INVENTION

It is an object of the present invention to eliminate the afore-mentioned defects through a new construction.

It is another object of the present invention to provide a light diverting device which has a long life span.

It is another object of the present invention to provide a light diverting device which shuts out contact of the optical oil with the outside air in order to prevent the optical oil from being dispersed.

It is another object of the present invention to provide a light diverting device which prevents dust or dirt from going into the optical oil.

It is another object of the present invention to provide a light diverting device capable of more effectively diverting the light rays transmitted through an optical conductor rod.

The above and other features and advantages of the present invention will become apparent from the following detailed description which goes with the accompanying drawings.

DESCRIPTION OF THE PREFERRED EMBODIMENT

Figure 1:
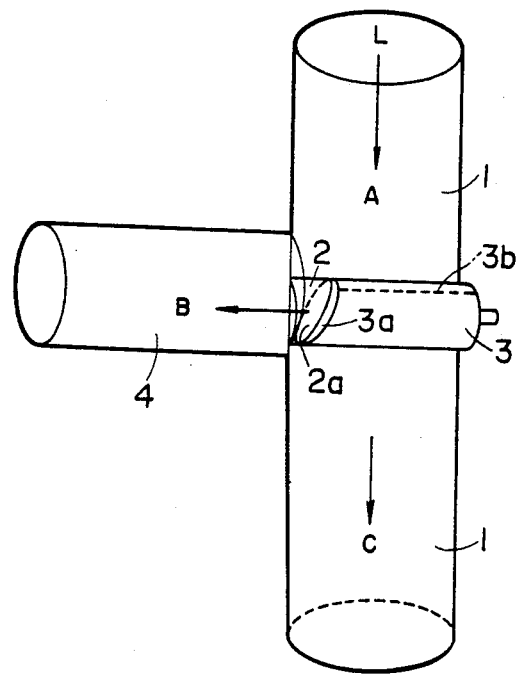
FIG. 1 is a front elevated view illustrating an embodiment of a light diverting device.
Figure 2:
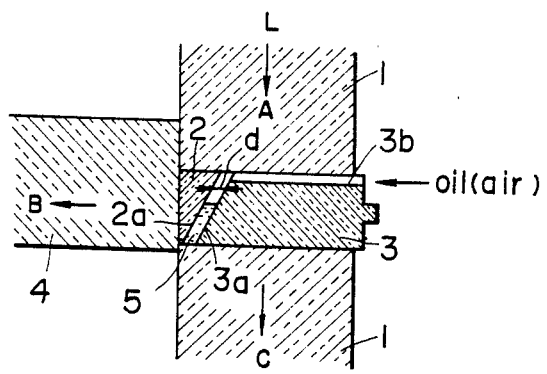
FIG. 2 is a cross-sectional view of the FIG. 1 device.

FIG. 1 is a front view illustrating an embodiment of a light diverting device which the present applicant has proposed. FIG. 2 is a cross-sectional view thereof. In FIGS. 1 and 2, a first optical conductor rod 1 has a through-hole formed in a radial direction, with a second optical conductor rod 2 and a third optical conductor rod 3 tightly inserted into the through-hole. The second optical conductor rod 2 is firmly fixed by use of optical paste or the like. The edge surface portion of the second optical conductor rod 2 in the through-hole is formed on a surface 2a inclined in relation to the direction of the first optical conductor rod's axis. The third optical conductor rod 3 has an inclined surface 3a opposed to the inclined surface 2a of the second optical conductor rod 2 and is tightly inserted into the through-hole so as to be able to move back and forth in the through-hole. A groove 3b is formed on the uppermost portion of the third optical conductor rod 3 along the direction of the axis thereof. Optical oil 5 is poured into the gap d between the inclined surface 2a of the second optical conductor rod 2 and the inclined surface 3a of the third optical conductor rod 3 by means of the groove 3b. When the third optical conductor rod 3 moves back and forth, air in the gap is let out of it or air is sucked into it so as to facilitate the movement of the third optical conductor rod 3.

In such a manner, after pouring optical oil 5 into the gap d, when the third optical conductor rod 3 is pushed forward, the distance of the gap d decreases and the level of optical oil rises. Conversely, when the third optical conductor rod 3 is pulled backward, the distance of the gap d increases and the level of optical oil falls.

The light rays L propagating in the direction shown by arrow A through the first optical conductor rod 1 are reflected on the inclined surface 2a of the second optical conductor rod 2 and directed in the direction shown by arrow B in the area of the gap where no optical oil exists, while the light rays L are directed in the direction shown by arrow C in the area of the gap where optical oil exists. Accordingly, the amount of light rays propagating in the direction of B can be adjusted in accordance with the level of optical oil in the gap. Such adjustment can be performed by changing the insertion depth of the third optical conductor rod 3.

A fourth optical conductor rod is represented by 4. It is firmly fixed on the outer circumferential surface of the first optical conductor rod 1 so as to cover tightly the inserted portion of the second optical conductor rod 2 which is unitarily formed with the second optical conductor rod 2. In such a construction as mentioned heretofore, the light rays diverted to direction B are taken out through the fourth optical conductor rod 4 and transmitted through an optical conductor cable not shown in the drawings but connected with the fourth optical conductor rod 4 onto an optional desired place for use in illumination or for other purposes.

However, in the afore-mentioned light diverting device, optical oil 5, existing in the space between the inclined surfaces, come in contact with the outside air through the groove 3a formed in the third optical conductor rod 3. Consequently, there exists the defects that the optical oil leaks through the groove 3a and that dust or dirt enters into the optical oil, making it difficult to use the device over a long period of time. Furthermore, since the groove portion 3a forms an air layer, light dispersion and a loss of light energy occur.

Furthermore, in the afore-mentioned light diverting device, the amount of diverted light rays is adjusted by moving the third optical conductor rod back and fourth. However, when the third optical conductor rod rotates the variation in the amount of optical oil per a predetermined stroke (reciprocating amount) varies so that the amount of diverted light rays per a predetermined stroke also varies.

Figure 3:
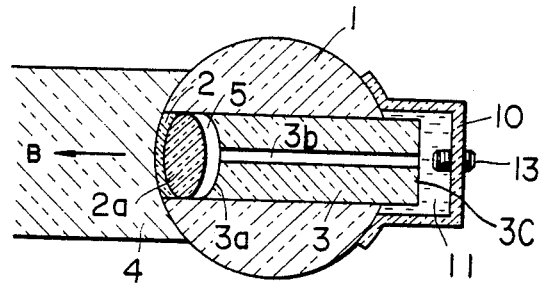
FIG. 3 is a plan cross-sectional view illustrating an embodiment of the light diverting device according to the present invention taken along the line II—II of FIG. 4.
Figure 4:
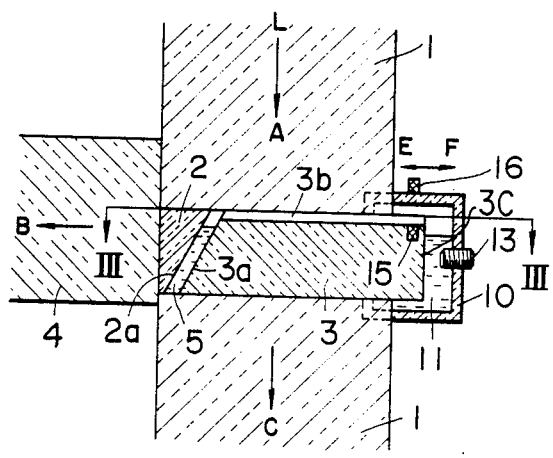
FIG. 4 is a cross-sectional side view illustrating the FIG. 3 device.

FIG. 3 is a cross-sectional plan view illustrating an embodiment of the light diverting device according to the present invention. FIG. 4 is a cross-sectional side view thereof. In those figures, the same reference numerals as in FIGS. 1 and 2 correspond to parts performing the same function as in FIGS. 1 and 2 respectively.

In FIGS. 3 and 4, 10 is a cover member which fits tightly and firmly onto the first optical conductor rod 1 so as to cover the edge surface portion 3c at the opposite side to the inclined surface 3a of the third optical conductor rod 3, and optical oil 11 is enclosed within the cover member 10. A permanent magnet 15 is unitarily mounted on the projecting end portion 3c of the third optical conductor rod 3, and another permanent magnet 16 with an inverse polarity is mounted on the external side of the cover 10 opposite the permanent magnet 15 for movement in the direction of the third optical conductor rod's 3 axis.

Consequently, when the permanent magnet 16 moves in the direction shown by arrow E, the third optical conductor rod 3 also moves in that same direction so that the distance between the inclined surface of the second optical conductor rod 2 and that of the third optical conductor rod 3 is lessened. Conversely, when the permanent magnet 16 moves in the direction shown by arrow F, the third optical conductor rod 3 also moves in that same direction so that the distance between both of the inclined surfaces is increased. In the same manner as described in applicant's other system, the light energy propagating in the direction of A through the first optical conductor rod 1 can be diverted in the direction of B and of C.

In such a manner, according to the present invention, since optical oil 5 is completely shut off from the air, the oil does not disperse and dust and dirt do not enter the oil so that the life span of the device is increased. Moreover, when the gap d between the inclined surfaces is at a minimum, the groove 3b formed on the optical conductor rod 3 is filled with optical oil 5. Conversely, when the gap d between the inclined surfaces is at a maximum the groove 3b has no optical oil 11. Consequently, dispersion of light energy decreases at the groove portion 3b and the loss of light energy can be minimized.

The numeral 13 represents a member serving both functions of being a stopper and a volume adjusting screw. The projection amount toward the internal space of the cover 10 is restricted by adjusting the screw 13 from the external side of the cover 10. Accordingly, the movement of the third optical conductor rod 3 in the direction F is restricted and the volume of optical oil 11 in the cover member 10 is adjusted. When the third optical conductor rod 3 moves in the direction F the amount of optical oil 11 entering into the groove 3b is adjusted. It can easily be understood that the stopper mechanism and the volume adjusting mechanism can be constructed by means of different members.

Figure 5:
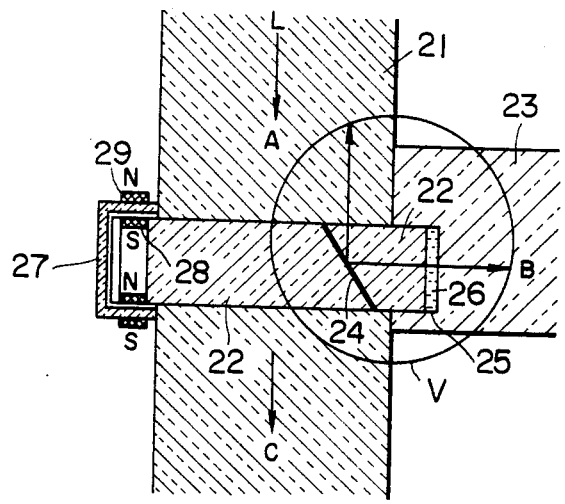
FIG. 5 is a cross-sectional side view illustrating another embodiment of the light diverting device according to the present invention.

FIG. 5 is a cross-sectional side view illustrating another embodiment of the light diverting device according to the present invention. In FIG. 5, 21 is a first optical conductor rod, 22 a second optical conductor rod, and 23 a third optical conductor rod. A through-hole is formed in the radial direction of the first optical conductor rod 21, and the second optical conductor rod 22 is rotatably and tightly inserted into the through-hole. The third optical conductor rod 23 is firmly fixed on the outer circumferential surface of the first optical conductor rod 21 so as to cover one edge portion surface of the second optical conductor rod 22. The second optical conductor rod 22 is unitarily combined with the first one at a location near the fixed portion of the third optical conductor rod 23 through interposition of a reflecting film layer 24 having a predetermined inclined angle in relation to the axis line of the second optical conductor rod 22.

Consequently, the light rays L propagating in the direction of arrow A through the optical conductor rod 21 are reflected onto the reflecting film layer 24 and directed in the direction of arrow B when the reflecting film layer 24 is perpendicular to the direction of the light rays' L propagation and are then further guided into the third optical conductor rod 23. A part of the light rays L propagating in the direction of arrow A through the optical conductor rod 21 is reflected onto the reflecting film layer 24 of the second optical conductor rod 22 and then directed or diverted in direction B and further guided into the third optical conductor rod 23.

The amount of light rays diverted into the third optical conductor rod 23 can be adjusted by rotating the second optical conductor rod 22. When the surface of the reflecting film layer 24 is parallel with the direction A of the light rays' propagation, namely, when the second optical conductor rod 22 is rotated 90° starting from the position shown in FIG. 5, the amount of light rays diverted into the third optical conductor rod 23 becomes zero. In the area of the angle from 0° to 90°, the amount of light rays diverted into the third optical conductor rod 23 varies in relation to the rotation angle of the second optical conductor rod 22.

As mentioned heretofore, according to the present embodiment, a part of the light rays L propagating in direction A through the first optical conductor rod 21 is reflected onto the reflecting film layer 24 of the second optical conductor rod 22 and directed or diverted in direction B and further guided into the third optical conductor rod 23. However, since the light rays not diverted propagate in direction C through the first optical conductor rod 21, the previously-described light diverting devices can be installed on the first optical conductor rod 21 in order for the light rays propagating through the first optical conductor rod 21 to be diverted and taken out, in order, by the respective light diverting devices.

The amount of light rays diverted can be adjusted by changing the rotation angle of the second optical conductor rod 22. However, it can also be adjusted by changing the reflection rate or reflexibility of the reflecting film layer 24 (in other words its "transparency"). For instance, a semi-transparent material of lesser reflexibility is used a the upstream side in relation to direction A of the light rays' propagation, and a material of greater reflexibility is used at the downstream side. The more downstream the location of the second optical conductor rod, the greater the reflexibility of the material used at that time. For example, at a final diverting point, an entirely-reflecting film is employed. Accordingly, an approximately equal amount of light rays can be diverted from all of the diverting portions of the respective optical conductor rods.

Furthermore, as mentioned heretofore, the second optical conductor rod 22 is rotated inside the through-hole of the first optical conductor rod in the embodiment according to the present invention. Optical oil is poured into the space between the rotatable contact surfaces in order to make the rotation of the rod smoother. When optical oil is poured into the space between the rotatable contact surfaces there exists no air layer so that the light rays do not disperse at all and the transmission efficiency of the light rays is greatly improved.

In that event, as shown in FIG. 5, the third optical conductor rod 23 has a hole 25 into which one edge portion of the second optical conductor 22 is inserted. In addition to rotatably and tightly inserting one edge portion of the second optical conductor rod 22 into the hole 25, optical oil 26 is enclosed in the remaining space of the hole 25. Optical oil 26 is employed as a lubricating oil in the space between the rotating contact surfaces of the first optical conductor rod 21 and the second optical conductor rod 22. Another edge portion of the second optical conductor rod 22 is covered by a cover member 27 which is firmly fixed on the outer circumferential surface of the first optical conductor rod 21. In such a construction, optical oil is prevented from being diffused into the open air. In addition, dirt, dust or the like contained in the air is also prevented from entering into the optical oil.

Furthermore, in FIG. 5, 28 is a permanent magnet mounted on the edge surface of the second optical conductor rod 22, and 29 is a rotatable permanent magnet mounted on the outer side of the cover member 27 opposite the permanent magnet 28. When the permanent magnet 29 rotates, the other permanent magnet 28 also rotates following the rotation of the former magnet so that the second optical conductor rod 22 also rotates.

Figure 6:
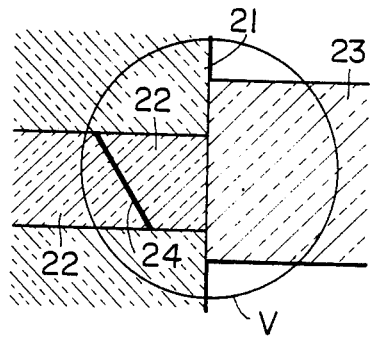
FIG. 6 is an expanded cross-sectional side view showing a modification of the area shown by circle V in FIG. 5.

Optical oil can also be enclosed in the cover member 27. The portion shown by a circle V in FIG. 5 is improved as shown in FIG. 6, namely the hole 25 of the third optical conductor rod 23 is omitted. Therefore, it is possible to simplify the construction of the third optical conductor rod and to facilitate its manufacture.

What is claimed is:

1. A light diverting device comprising a first cylindrical conductor rod having an axis in an axial direction and a cylindrical through-hole in a radial direction, said through-hole comprising first and second portions, a second cylindrical optical conductor rod tightly inserted into the first portion of said through-hole and firmly fixed therein, said second optical conductor rod having an edge surface inclined in relation to the direction of said first optical conductor rod's axis, a third cylindrical optical conductor rod having an axis in an axial direction and being tightly engaged in the second portion of said through-hole, said third optical conductor rod having an end portion capable of projecting outwardly from said first optical conductor rod and having an edge surface opposite said end portion for engaging said inclined edge surface of said second optical conductor rod, said edge surfaces defining an inclined space therebetween, a fourth cylindrical optical conductor rod mounted on an outer circumferential surface of said first optical conductor rod to cover the first portion of said through-hole and said second optical conductor rod, optical oil enclosed in the inclined space defined by said edge surfaces of said second optical conductor rod and said third optical conductor rod, said third optical conductor rod being tightly engaged in said through-hole so as to move back and forth therein to adjust the size of said inclined space, a cover member mounted on the outer circumferential surface of said first optical conductor rod opposite said fourth optical conductor rod defining a hermetically sealed space about said end portion of said third optical conductor rod opposite said edge surface of said third optical conductor rod, said sealed space containing optical oil, and a groove formed on an outer circumferential surface of said third optical conductor rod in the axial direction thereof for connecting the sealed space defined by said cover member and the inclined space defined by the edge surfaces of said second and third optical conductor rods.

2. A light diverting device, as defined in claim 1, further comprising a first permanent magnet provided under said groove and projecting into said third optical conductor rod in said end portion and a second permanent magnet of inverse polarity to said first permanent magnet provided on said cover member outside said sealed space, said second permanent magnet being movable along the direction of the axis of the third optical conductor rod, whereby movement of the second permanent magnet moves the third optical conductor rod back and forth in the through-hole.

3. A light diverting device, as defined in claim 1, further comprising means for adjusting a volume of said sealed space for varying the amount of optical oil in said sealed space, groove and inclined space.

4. A light diverting device, as defined in claim 1, wherein, when said inclined space is a minimum, the groove of said third optical conductor rod is filled with optical oil from said inclined space.

5. A light diverting device, as defined in claim 1, wherein, when said inclined space is at a maximum, the groove of said third optical conductor rod is filled with optical oil from said sealed space.

6. A light diverting device, as defined in claim 1, further comprising a stopper means mounted on said cover member for restricting the maximum projection of said end portion of said third optical conductor rod into said sealed space.

7. A light diverting device comprising a first optical conductor rod having an axis in an axial direction and a cylindrical through-hole in a radial direction, a second optical conductor rod having an axis and engaged in said through-hole, optical oil for tightly and rotatably engaging said second optical conductor rod in said through-hole, said second optical conductor rod comprising first and second ends, a third optical conductor rod covering the first end of said second optical conductor rod and being mounted on an outer surface of said first optical conductor rod, said second optical conductor rod further comprising a reflecting film layer interposed therein at a predetermined inclined angle relative to the axis of said second optical conductor rod, said reflecting film layer being interposed off-center of the axis of the first optical conductor rod towards the first end of said second optical conductor rod, whereby light entering the first optical conductor rod is diverted to the third optical conductor rod by the reflecting film layer in an amount depending on the position of the reflecting film layer with respect to the first optical conductor rod, and a cover means mounted on an outer surface of said first optical conductor rod for hermetically sealing the second end of said second optical conductor rod.

8. A light diverting device comprising a first optical conductor rod having an axis in an axial direction and a cylindrical through-hole in a radial direction, a second optical conductor rod having an axis and engaged in said through-hole, optical oil for tightly and rotatably engaging said second optical conductor rod in said through-hole, said second optical conductor rod comprising first and second ends, a third optical conductor rod covering the first end of said second optical conductor rod and being mounted on an outer surface of said first optical conductor rod, said third optical conductor rod further comprising a recess and the first end of said second optical conductor rod extends outside of said through-hole and into said recess, said second optical conductor rod further comprising a reflecting film layer interposed therein at a predetermined inclined angle relative to the axis of said second optical conductor rod, said reflecting film layer being interposed off-center of the axis of the first optical conductor rod towards the first end of said second optical conductor rod, whereby light entering the first optical conductor rod is diverted to the third optical conductor rod by the reflecting film layer in an amount depending on the position of the reflecting film layer with respect to the first optical conductor rod.

9. A light diverting device comprising a first optical conductor rod having an axis in an axial direction and a cylindrical through-hole in a radial direction, a second optical conductor rod having an axis and engaged in said through-hole, optical oil for tightly and rotatably engaging said second optical conductor rod in said through-hole, said second optical conductor rod comprising first and second ends, a third optical conductor rod covering the first end of said second optical conductor rod and being mounted on an outer surface of said first optical conductor rod, said second optical conductor rod further comprising a reflecting film layer interposed therein at a predetermined inclined angle relative to the axis of said second optical conductor rod, said reflecting film layer being interposed off-center of the axis of the first optical conductor rod towards the first end of said second optical conductor rod, whereby light entering the first optical conductor rod is diverted to the third optical conductor rod by the reflecting film layer in an amount depending on the position of the reflecting film layer with respect to the first optical conductor rod, a cover means mounted on an outer surface of said first optical conductor rod for hermetically sealing the second end of said second optical conductor rod, a first permanent magnet mounted on the second optical conductor rod near the second end thereof and a second movable permanent magnet of inverse polarity to said first permanent magnet mounted on the cover means and disposed radially outwardly of said first permanent magnet, whereby rotational movement of said second permanent magnet causes rotation of said first permanent magnet and said second optical conductor rod in said through-hole.

* * * * *